(12) United States Patent
Nuss et al.

(10) Patent No.: US 9,014,004 B2
(45) Date of Patent: Apr. 21, 2015

(54) METHOD FOR MANAGING LOAD BALANCE IN A CELLULAR HETEROGENEOUS NETWORK

(71) Applicant: Cisco Technology, Inc., San Jose, CA (US)

(72) Inventors: Ziv Nuss, Tzur Yigal (IL); Itay Meir Mizrahi, Ness-Ziyonna (IL)

(73) Assignee: Cisco Technology, Inc., San Jose, CA (US)

( * ) Notice: Subject to any disclaimer, the term of this patent is extended or adjusted under 35 U.S.C. 154(b) by 203 days.

(21) Appl. No.: 13/693,482

(22) Filed: Dec. 4, 2012

(65) Prior Publication Data

US 2014/0155081 A1 Jun. 5, 2014

(51) Int. Cl.
*H04W 28/08* (2009.01)
*H04W 72/04* (2009.01)
*H04W 36/22* (2009.01)
*H04W 84/04* (2009.01)

(52) U.S. Cl.
CPC .......... *H04W 72/0486* (2013.01); *H04W 28/08* (2013.01); *H04W 36/22* (2013.01); *H04W 84/045* (2013.01)

(58) Field of Classification Search
None
See application file for complete search history.

(56) References Cited

U.S. PATENT DOCUMENTS

2008/0107074 A1* 5/2008 Salmenkaita et al. ........ 370/330
2012/0087247 A1* 4/2012 Min et al. ..................... 370/237

FOREIGN PATENT DOCUMENTS

| EP | 2770773 | 8/2014 |
|---|---|---|
| WO | WO2013/112082 | 8/2013 |
| WO | WO2014/087393 | 6/2014 |

OTHER PUBLICATIONS

PCT Mar. 17, 2014 International Search Report and Written Opinion from International Application Serial No. PCT/IL2013/000086, 12 pages.
EPO Jul. 29, 2014 Extended Search Report from European Application Serial No. EP13195673, 12 pages.
Ericsson, et al., "LPN Range Expansion in Co-Channel Deployment in Heterogeneous Networks," 3GPP Draft R1-125219,, 3rd Generation Partnership Project (3GPP), Mobile Competence Centre; 650; Route Des Lucioles; F-06921 Sophia-Antipolis; Nov. 2012, 7pages; XP050663076.

(Continued)

*Primary Examiner* — Charles Appiah
*Assistant Examiner* — Randy Peaches
(74) *Attorney, Agent, or Firm* — Patent Capital Group

(57) ABSTRACT

A method is provided for managing load balance in cellular heterogeneous networks. The method comprises: providing a plurality of spectrum carriers for conveying communication signals to/from a macro cell. At least one of the carriers is a shared carrier for conveying communication signals to/from the macro cell and to/from at least one small cell located at the geographical vicinity of the macro cell, and wherein the shared carrier is characterized in that data is the only type of communication signals being conveyed thereat when the cellular network is under congestion. One or more other spectrum carriers are dedicated carriers adapted to essentially convey voice calls, and wherein user terminals are steered away from dedicated carriers to the shared carrier, so that when a data session is initiated for a user terminal camped on the shared carrier, that session will be conveyed one or more of the small cells.

19 Claims, 4 Drawing Sheets

(56) References Cited

OTHER PUBLICATIONS

Ericsson, et al., "On the Feasibility of Operational Carrier Selection," 3GPP Draft R3-112991, 3rd Generation Partnership Project (3GPP), Mobile Competence Centre; 650; Route Des Lucioles; F-06921 Sophia-Antipolis; Nov. 2011, 7 pages; XP050566183.

Qualcomm Incorporation: "Design Objectives and Deployment Scenarios for Hetnets," 3GPP Draft R1-124528, $3^{rd}$ Generation Partnership Project (3GPP), Mobile Competence Centre; 650; Route Des Lucioles; F-06921 Sophia-Antipolis; Sep. 2012, XP050662404.

Research in Motion UK Limited, "Scoping the UMTS HetNet Study," 3GPP Draft R1-124276, 3rd Generation Partnership Project (3GPP), Mobile Competence Centre; 650; Route Des Lucioles; F-06921 Sophia-Antipolis; Sep. 2012; XP050662177.

Nokia Corporation, et al., "SON WI Status Overview," 3GPP Draft R2-093231, 3rd Generation Partnership Project (3GPP), Mobile Competence Centre; 650; Route Des Lucioles; F-06921 Sophia-Antipolis; Apr. 2009 XP050340925.

Telecom Italia, et al., "Self-optimization use case: self-tuning of cell reselection parameters for load balancing," 3GPP Draft R3-071432, 3rd Generation Partnership Project (3GPP), Mobile Competence Centre; 650; Route Des Lucioles; F-06921 Sophia-Antipolis; Aug. 2007 XP050162260.

* cited by examiner

500  PROVIDING A PLURALITY OF FREQUENCY CARRIERS FOR CONVEYING COMMUNICATION SIGNALS TO/FROM A MACRO CELL

510  PROVIDING A SHARED CARRIER ADAPTED TO ENABLE CONVEYING COMMUNICATION SIGNALS TO/FROM THE MACRO CELL AND TO/FROM AT LEAST ONE SMALL CELL

520  PROVIDING AT LEAST ONE DEDICATED FREQUENCY CARRIER, ADAPTED ESSENTIALLY TO CONVEY VOICE CALLS

530  STEERING USER TERMINALS WHICH ARE IN IDLE MODE, AWAY FROM AT LEAST ONE OF THE DEDICATED CARRIERS TO THE SHARED CARRIER

540  CARRYING OUT A DATA SESSION BY A ISER TERMINAL THAT WAS STEERD TO THE SHARED CARRIER, WHEREIN THE SESSION IS CONVEYED VIA ONE OR MORE SMALL CELLS

FIG. 5

METHOD FOR MANAGING LOAD BALANCE IN A CELLULAR HETEROGENEOUS NETWORK

TECHNICAL FIELD

The invention relates to a system and a method for managing wireless networks, and in particularly to management of load balancing in cellular mobile communication systems.

BACKGROUND

In current cellular mobile broadband systems the achievable data rates are strongly dependent on the users' positions in the network.

In order for wireless networks operators to solve one of their biggest problems—how to get more signal strength where one needs or wants it most, the operators have started in the recent years to deploy their own or rely on end users to buy very small Base Stations, in order to meet the increasing demand for data traffic. This new type of cell sites, referred to hereinbelow as "small cells" or "metro cells", used in conjunction with wireless cells of the traditional cellular networks (macro cells). Networks that include both macro cells and metrocells are referred to herein as heterogeneous networks (HetNets).

The term "small cells" as used herein and throughout the specification and claims encompass femtocells, picocells microcells and metrocells. Small-cell networks can also be realized by means of distributed radio technology consisting of centralized baseband units and remote radio heads. Beamforming technology (focusing a radio signal on a very specific area) can be utilized to further enhance or focus small cell coverage. A common factor in all these approaches to small cells is that they are centrally managed by mobile network operators.

Small cells provide a small radio footprint, which can range from 10 meters within urban and in-building locations to 2 km for a rural location.

According to the solution being adopted by the operators, the end-users may buy small devices that are personal cellular base stations. The device typically has an antenna to boost the available signal as well as an Internet connection. The device uses the end user Internet connection to connect to the service provider's network and to route the user's phone calls.

With small cells deployed in a single carrier shared with the macro cells in the network, UEs at (or near) the coverage area of a small cell could ideally camp on it to offload the macro network. However, since the power disparity between the macro cells and the small cells is very large, normal cell selection/re-selection procedures will typically result in UEs camping on the macro network for which power levels are higher, even though much larger capacity can be provided by the small cells layer.

SUMMARY OF THE DISCLOSURE

The disclosure may be summarized by referring to the appended claims.

It is an object of the present invention to provide a method and apparatus to enable increased data traffic offload to small cells while maintaining performance KPIs of the network and avoiding overload thereat.

It is another object of the present invention to provide a method and apparatus to enable dynamic tuning of idle mode settings in dedicated frequency carriers to enable reselection of shared frequency carrier(s) from dedicated frequency carriers.

It is still another object of the present invention to provide a method and apparatus which enable automatic activation when small cells are actually being deployed activated.

It is yet another object of the present invention to provide a method and apparatus to enable dynamic balancing of the load between different macro network "dedicated carriers" (frequency carriers at which no small cells are operative), the macro network "shared carrier" (shared between the macro network and the small cell layer) and the small cells operating at the shared carrier.

Other objects of the present invention will become apparent from the following description.

According to a first embodiment there is provided a method for managing load balance in a cellular heterogeneous network ("HetNet") comprising one or more macro cells and a plurality of small cells, wherein the method comprises the steps of:

providing a plurality of frequency carriers for conveying communication traffic to and from at least one of the one or more macro cells, and wherein:

at least one of the frequency carriers is a shared carrier, being adapted to enable conveying communication traffic to and from the at least one macro cells and to/from at least one small cell of the plurality of small cells, the at least one small cell is located at the geographical vicinity of the at least one macro cell, and wherein the shared carrier is further characterized in that data is essentially the only type of communication traffic being conveyed thereat when the cellular network is under congestion;

at least one other of the spectrum carriers is a dedicated frequency carrier, being adapted to essentially convey voice calls thereat;

and wherein user terminals are steered away from the one of the at least one dedicated carriers to the shared carrier (i.e. for camping on the corresponding cells or connected to the network by using the shared frequency carrier rather than by using a dedicated frequency carrier, all without physically moving from its geographical position), so that when a data session is initiated for a user terminal from among the user terminals associated with the shared frequency carrier, that session will be conveyed towards the core cellular network preferably via one or more of the at least one small cell.

According to another embodiment, at least one of the user terminals is steered to the shared carrier is in idle mode, so that when a data session is initiated for the user terminal, it will be conveyed towards the core cellular network preferably via one or more of the at least one small cell.

In accordance with another embodiment, the steering of a user terminal being at an idle mode is carried out by manipulating network cell reselection parameters that are specific to idle mode.

By yet another embodiment, the method further comprising a step of steering at least one of the user terminals away from the shared carrier to one of the at least one dedicated carriers.

According to still another embodiment, the at least one of the user terminals steered away from the shared carrier to one of the at least one dedicated carriers, is a user terminal to which a voice call is being initiated.

By yet another embodiment, the method provided is further characterized in that it is carried out for a macro reference cluster that includes all of a respective small cell's intra-frequency and inter-frequency macro network neighbors. Preferably, these neighbors are:
  the parent macro cell covering the area of the small cell and operating in the shared carrier (Ms);
  the intra-frequency macro neighbors of the parent cell in the shared carrier (Ns);
  the inter-frequency co-sector macro neighbors of the parent cell in the dedicated carriers (Md); and
  the inter-frequency macro neighbors of the parent cell (co-sectors of Ns, in the dedicated carriers).

Preferably, the parent macro cell of the small cell (Ms) is detected based on location information of the small cell, and/or a macro neighbor list detected by the small cell.

In accordance with another embodiment, user terminals are being steered away from a certain dedicated carrier to the shared carrier only when the load at said certain dedicated carrier is above a threshold (preferably a configurable threshold).

According to another embodiment, the method further comprising a step of associating an offset parameter (e.g. $Q_{offset}$) to at least one of the small cells, thereby manipulating user terminals located at the vicinity of the at least one small cell. Thus, user terminals that would otherwise be camping/serviced by the at least one macro cell, will be associated (e.g. camping/serviced) with the at least one small cell, or in another case user terminals that would otherwise be camping/serviced by the at least one small cell, will be camping/serviced with the at least one macro cell.

By yet another embodiment, the at least one user terminal triggered to be associated with the small cell, is currently being in an idle mode.

By still another embodiment, the method is carried out in a parent macro cell of a respective small cell rather than at the entire reference cluster.

In accordance with another embodiment, in case that an overload is detected for at least one of the small cells, the offset parameter of the at least one small cell is temporarily changed to enable users being currently serviced thereby to reselect and be associated with a macro cell.

According to another embodiment, in case that an overload is detected for at least one of the small cells, the transmission power of that at least one small cell is reduced to prevent users from being handed over to the small cell after their connection has been setup.

Other aspects of the present invention such as certain features of a controller and a communication system, which are adapted to operate in accordance with the principles of the method described hereinabove, mutatis mutandis, are encompassed within the scope of the present invention.

BRIEF DESCRIPTION OF THE DRAWINGS

For a more complete understanding of the present invention, reference is now made to the following detailed description taken in conjunction with the accompanying drawings wherein:

FIG. 5—exemplifies an embodiment of a method for carrying out a certain aspect of present the invention.

DETAILED DESCRIPTION

In this disclosure, the term "comprising" is intended to have an open-ended meaning so that when a first element is stated as comprising a second element, the first element may also include one or more other elements that are not necessarily identified or described herein, or recited in the claims.

In the following description, for the purposes of explanation, numerous specific details are set forth in order to provide a better understanding of the present invention by way of examples. It should be apparent, however, that the present invention may be practiced without these specific details.

One of the main underlying ideas of the present invention is to provide a method and means that enable automatic optimization of data offload to the small cells layer in a multi carrier deployment. Preferably, to do so, the system continuously monitors the load at the dedicated carriers, shared carrier and at the small cells and dynamically adjusts the idle mode settings (cell re-selection bias) to balance the load between the carriers, by having UEs preferentially camp at the shared carrier when located near small cells, and at the small cells when load permits.

Since it is not desired that all users of the entire network (including areas where no small cells are deployed) will camp at the shared carrier (as it may increase admission rejects), an embodiment of the present invention enables automatic activation of the system only in areas where small cells have actually been deployed and preferably are currently operative.

The method of the present invention is preferably also adapted to comply with a service segmentation approach designed to assure voice Quality of Experience (QoE) is maintained.

Figure 1:
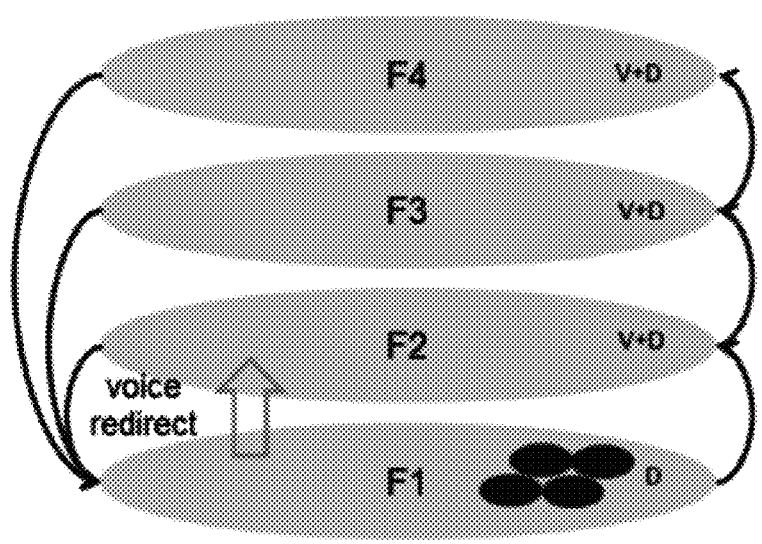
FIG. 1—illustrates an example of a layer management strategy for deploying small cells according to an embodiment of the invention.

FIG. 1 illustrates an example of a layer management strategy for deploying small cells according to an embodiment of the invention.

Typically, as spectrum is scarce, a separate carrier for the deployment of only small cells only would not be available. Therefore, small cells are deployed at a single carrier (F1 in the FIG. 1 example), in which also macro cells are deployed. This carrier is referred to herein as the "shared carrier", as it is shared between macro cells and the small cells.

The introduction of mass numbers of small cells into the network might increase the noise level and introduce challenges related to mobility (due to the small cells capabilities, as well as to the extensive Primary Scrambling Code (PSC) reuse). To address this problem, a service segmentation approach is suggested, by which the shared carrier (F1) is used to provide data capacity only, while in order to maintain QoE, voice calls are redirected to dedicated carriers (F2 ... F4 in the FIG. 1 example).

Thus, the system of the present invention will steer users so that they camp at the shared carrier, and consequently, when a data session is initiated it will be served by the small cells at the shared carrier, thus achieving effective offload from the macro cells and significant capacity gain.

As users are steered away to the shared carrier, the non-used capacity of the dedicated carriers is increased, allowing serving additional voice traffic redirected from the shared carrier.

Figure 2:
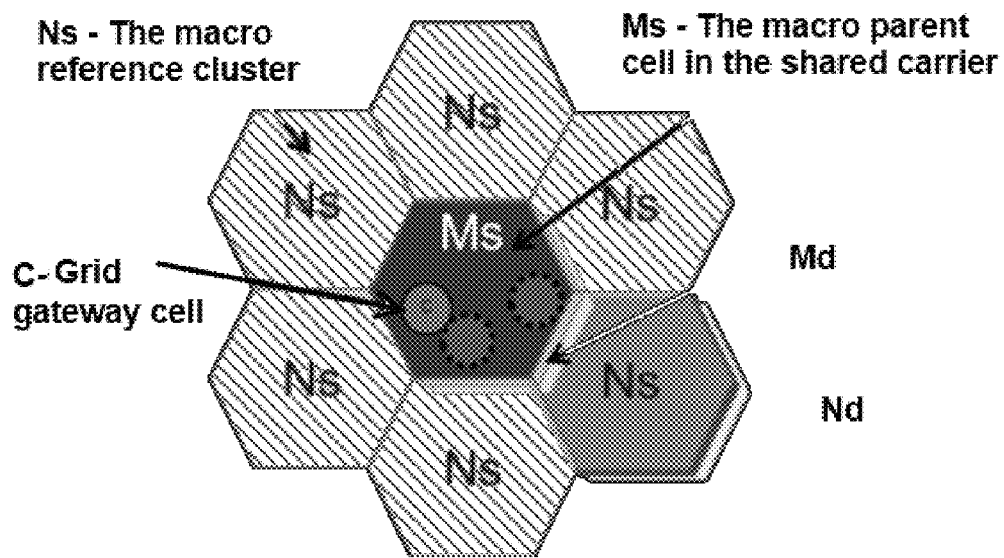
FIG. 2—illustrates a Macro Reference Cluster that includes all of the small cell's intra-frequency and inter-frequency macro network neighbors.

According to an embodiment of the invention, the method is carried out on an automatically detected Macro Reference Cluster. The Macro Reference Cluster as demonstrated for example in FIG. 2 includes all of the small cell's intra-frequency and inter-frequency macro network neighbors, as follows:

the parent macro cell covering the same area of the small cell and operating in the shared carrier (Ms);

the intra-frequency macro neighbors of the parent cell in the shared carrier (Ns);

the inter-frequency co-sector macro neighbors of the parent cell in the dedicated carriers (Md); and the inter-frequency macro neighbors of the parent cell (co-sectors of Ns, in the dedicated carriers).

According to the method provided, the parent macro cell of a small cell (Ms) is detected based on location information (longitude, latitude etc.) of the small cell, and the macro neighbor list detected by the small cell.

Preferably, the method comprises a step of dynamically offloading users from the dedicated carriers to the shared carrier by managing idle mode parameters of the mobile terminals.

Figure 3:
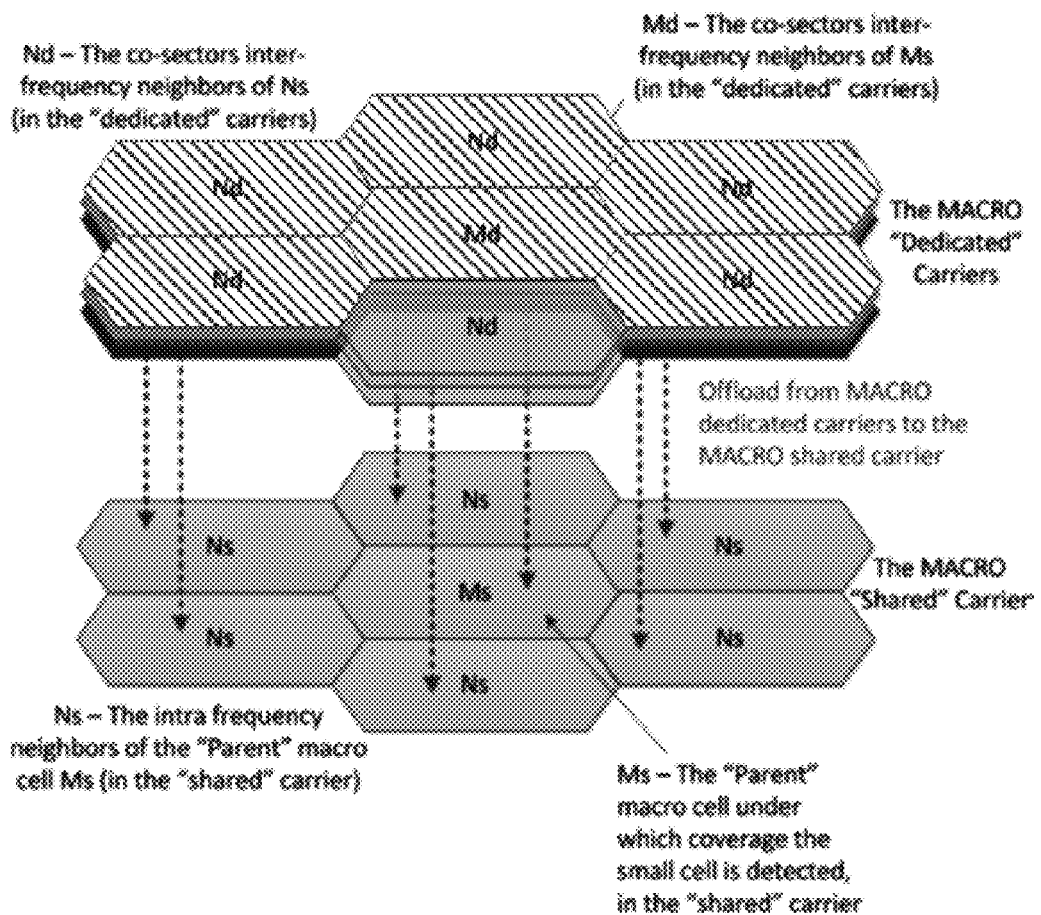
FIG. 3—exemplifies a first phase of a method for offloading users from dedicated carriers and the shared carrier to the small cells according to an embodiment of the invention.

As illustrated in FIG. 3, the load at the dedicated carrier cells (Md & Nd) and shared carrier cells (Ms & Ns), is preferably being monitored on a continuous basis. The users will be steered away from a dedicated carrier cell only if the load at this carrier is above a configurable threshold.

By another embodiment, the solution provided by the present invention is operative to dynamically change the cell reselection bias, preferably in small steps (and more preferably within configurable minimum and maximum range). For example, in systems that comply with UMTS technology the Qoffset2sn parameter is defined as being the offset between CPICH Ec/No of source & target The offset is added to the CPICH Ec/No quantity of the cell before the UE evaluates if it is better than that of its currently serving cell. A positive offset will effectively increase the size of the target cell on account of the source (serving) cell.

By another embodiment, cell load level can be used to decide when the mobile terminals should be steered away from dedicated carrier macro cells to shared carrier macro cells. For example, in case the load at the shared carrier cell is below a threshold, the load can be increased by using smaller (larger negative) bias (in UMTS Qoffset2sn value) at the dedicated carrier cells.

In case the load at the shared carrier cell is above a threshold, the load will be decreased by using larger (smaller negative) bias (in UMTS Qoffset2sn value) at the dedicated carrier cells.

Optionally, the method further comprises a step of confirming that cell reselection is enabled, for example in UMTS one should make sure that the value of the parameter SinterSearch is low enough, to allow enough users to perform neighbor cell measurements, which would and consequently lead to potential cell reselection.

Figure 4:
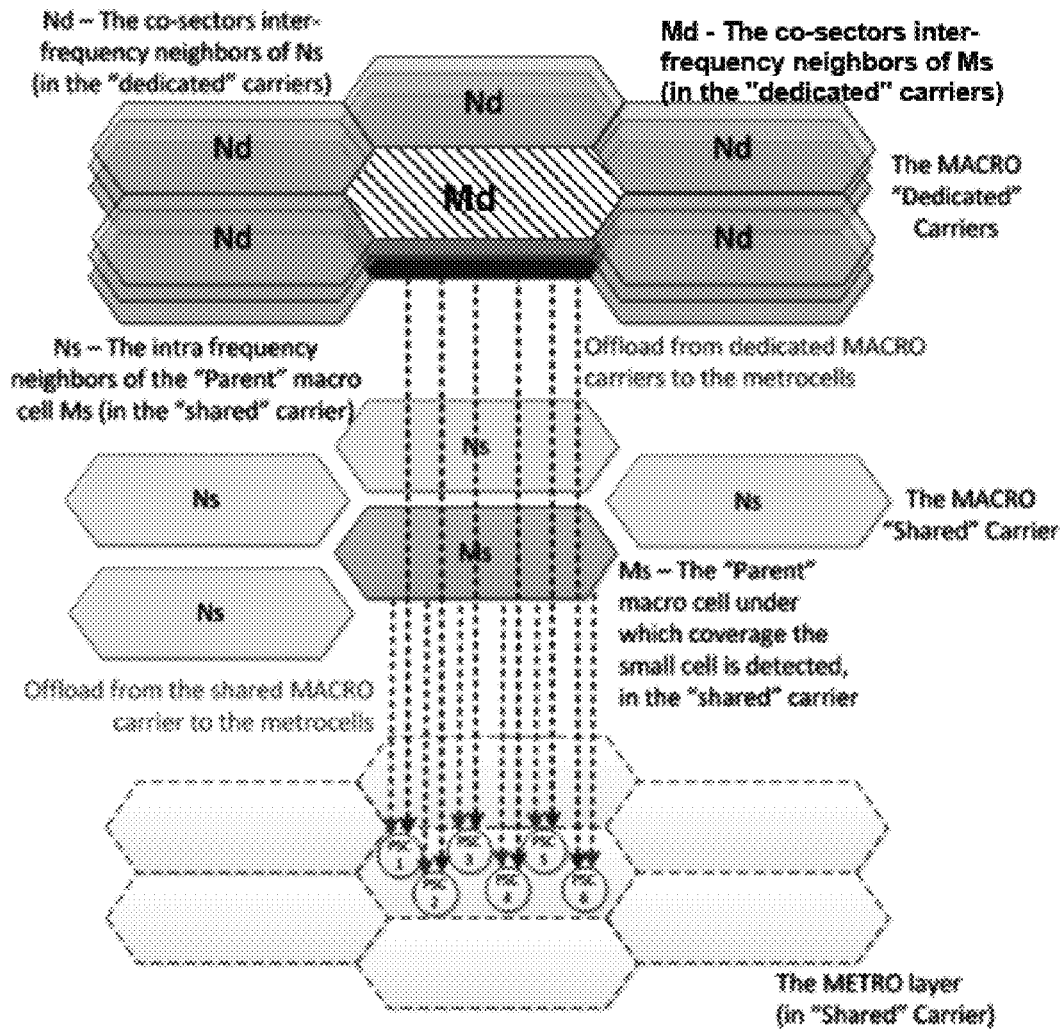
FIG. 4—exemplifies a second phase of a method for offloading users from dedicated carriers and the shared carrier to the small cells according to an embodiment of the invention.

FIG. 4 demonstrates another embodiment of the invention by which the users' terminals are dynamically offloaded from the dedicated carriers and the shared carrier to the small cells by manipulating their idle mode parameters. Offload from the dedicated carriers to small cells is included to assure effective offload also in areas where macro coverage in the shared carrier is poor or even non-existing.

The offload to the small cells may be limited to the parent macro cell (and not in the entire reference cluster), since offload from neighbor cells will require too much offset which in turn will cause users having poor link conditions, to select the small cell.

Preferably, when an overloaded small cell (e.g. metrocell) is detected, the idle mode cell reselection parameters (such as Qoffset2sn in case of a UMTS compatible system) are temporarily changed to enable users being currently served by that small cell, to reselect to the macro cell.

Optionally or in addition to changing the idle mode cell reselection parameters like Qoffset2sn, the small cell power may be reduced (e.g. in parallel) in order to prevent users from being handed over to the small cell after their connection has been setup (via active mode mobility procedure).

In accordance with another embodiment, parameters that control the cell reselection process of this group of inner-grid small cells may be varied (manipulated), for example the parameter $Q_{offset2sn}$, in order to affect the cell reselection process when carried out by a UE currently being in an idle mode.

In addition or in the alternative, the small cell power may be reduced (e.g. in parallel to changing the $Q_{offset}$). This feature is rather helpful for gateway small cells as the operator sets the parameters to ensure that mobility is enabled between the macro cell and a respective gateway small cell, but of course is not too relevant for inner-grid small cells, as typically, no hand over procedure would be held by which a UE is handed over to the inner-grid small cells from the macro cell.

FIG. 5 exemplifies an embodiment of a method for carrying out a certain aspect of present the invention, which comprises the following steps: providing a plurality of frequency carriers for conveying communication signals to and from at least one macro cell (step 500), providing a shared carrier adapted to enable conveying communication signals to and from the at least one macro cells and to/from at least one small cell of the plurality of small cells (step 510), and providing at least one dedicated frequency carrier, adapted to essentially convey voice calls (step 520). When the system is congested (i.e. under overload conditions), steering user terminals being in idle mode from at least one of the dedicated carriers to the shared carrier (step 530). Next, a data session is carried out by a user terminal from among the user terminals which were steered to the shared frequency carrier and now is camped thereon, and the data session is conveyed via one or more of the at least one small cell (step 540).

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

The present invention has been described using detailed descriptions of embodiments thereof that are provided by way of example and are not intended to limit the scope of the invention in any way. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

The invention claimed is:

1. A method for managing load balance in a cellular heterogeneous network comprising one or more macro cells and a plurality of small cells, wherein the method comprises the steps of:
   providing a plurality of spectrum carriers for conveying communication traffic to and from at least one of the one or more macro cells, and wherein:
   at least one of the spectrum carriers is a shared carrier, being adapted to enable conveying communication traffic to and from the at least one macro cells and at least one small cell of the plurality of small cells, said at least one small cell is located at the geographical vicinity of the at least one macro cell, and wherein said shared carrier is further characterized in that data is the only type of communication traffic being conveyed thereat when the cellular heterogeneous network is under congestion;
   at least one other of the spectrum carriers is a dedicated carrier, being adapted to essentially convey voice calls thereat;
   and wherein user terminals are steered away from the one of the at least one dedicated carriers to the shared carrier, so that when a data session is initiated for a user terminal of the user terminals associated with the shared carrier, that session will be conveyed towards the cellular heterogeneous network via one or more of the at least one small cell.

2. The method of claim 1, wherein at least one of the user terminals is steered to the shared carrier when being in idle mode, so that when a data session is initiated for said user terminal, it will be conveyed towards the cellular heterogeneous network via one or more of the at least one small cell.

3. The method of claim 2, wherein the steering of a user terminal being at an idle mode is carried out by manipulating idle mode parameters to be received by said user terminal.

4. The method of claim 1, further comprising a step of steering at least one of the user terminals away from the shared carrier to one of the at least one dedicated carriers.

5. The method of claim 4, wherein the at least one user terminal being steered away from the shared carrier to one of the at least one dedicated carriers, is a user terminal to which a voice call is being initiated.

6. The method of claim 1, characterized in that it is carried out for a macro reference cluster that includes the at least one small cell's intra-frequency and inter-frequency macro network neighbors.

7. The method of claim 6, wherein the at least one small cell's intra-frequency and inter-frequency macro network neighbors are:
   a parent macro cell covering the same area of the small cell and operating in the shared carrier (Ms);
   intra-frequency macro neighbors of the parent cell in the shared carrier (Ns);
   inter-frequency co-sector macro neighbors of the parent cell in the dedicated carriers (Md); and
   inter-frequency macro neighbors of the parent cell.

8. The method of claim 7, wherein the parent macro cell of a small cell (Ms) is detected based on location information of the small cell, and/or a macro neighbor list detected by the small cell.

9. The method of claim 6, wherein the method is carried out in a parent macro cell of a respective small cell rather than in the entire macro reference cluster.

10. The method of claim 1, wherein user terminals are being steered away from a certain dedicated carrier to the shared carrier only when the load at said certain dedicated carrier is above a threshold.

11. The method of claim 1, further comprising a step of associating an offset parameter to at least one of the small cells, thereby manipulating user terminals located at the vicinity of said at least one small cell that would otherwise camp on and/or be serviced by the at least one macro cell, to camp on and/or be serviced by said at least one small cell.

12. The method of claim 11, wherein the at least one user terminal triggered to be associated with the small cell, is in an idle mode.

13. The method of claim 11, wherein the offset parameter of a group of a plurality of small cells may be varied in order to affect reselection process of the small cells, carried out by a user terminal currently being in an idle mode.

14. The method of claim 12, wherein in case that an overload is detected for at least one of the small cells, the offset parameter of said at least one small cell is temporarily changed to enable user terminals being currently serviced thereby to reselect and be associated with a macro cell.

15. The method of claim 12, wherein in case that an overload is detected for at least one of the small cells, the transmission power of said at least one small cell is reduced to prevent users from camping thereat when being in an idle mode or when being handed over to the small cell after their connection has been setup.

16. The method of claim 1, further comprising a step of associating an offset parameter to at least one of the small cells, thereby manipulating user terminals located at the vicinity of said at least one small cell that would otherwise be serviced by the at least one small cell, to be associated with the at least one macro cell.

17. The method of claim 1, further comprising a step of setting one or more parameters to enable and/or trigger cell reselection activity of the user terminal.

18. The method of claim 17, wherein the one or more parameters that enable and/or trigger cell reselection activity of the user terminal, are further operative to initiate neighboring cell measurements.

19. The Method of claim 18, wherein the cellular heterogeneous network which is operative in compliance with UMTS technology and the one or more parameters is $S_{intersearch}$.

* * * * *